US012721497B2

(12) United States Patent
Schlief

(10) Patent No.: US 12,721,497 B2
(45) Date of Patent: Sep. 1, 2026

(54) HOUSEHOLD APPLIANCE, IN PARTICULAR DISHWASHER

(71) Applicant: Miele & Cie. KG, Gütersloh (DE)

(72) Inventor: Martin Schlief, Werther (DE)

(73) Assignee: Miele & Cie. KG, Gütersloh (DE)

( * ) Notice: Subject to any disclaimer, the term of this patent is extended or adjusted under 35 U.S.C. 154(b) by 100 days.

(21) Appl. No.: 18/868,790

(22) PCT Filed: Jun. 2, 2023

(86) PCT No.: PCT/EP2023/064766
§ 371 (c)(1),
(2) Date: Nov. 25, 2024

(87) PCT Pub. No.: WO2023/237419
PCT Pub. Date: Dec. 14, 2023

(65) Prior Publication Data

US 2025/0344931 A1 Nov. 13, 2025

(30) Foreign Application Priority Data

Jun. 10, 2022 (BE) .................................. 2022/5451

(51) Int. Cl.
*A47L 15/42* (2006.01)
*E05F 3/16* (2006.01)
*F24C 15/02* (2006.01)

(52) U.S. Cl.
CPC ............ *A47L 15/4261* (2013.01); *E05F 3/16* (2013.01); *E05Y 2201/21* (2013.01); (Continued)

(58) Field of Classification Search
CPC ...... A47L 15/4261; F24C 15/023; E05F 3/16; E05Y 2201/21; E05Y 2900/304; E05Y 2201/41
See application file for complete search history.

(56) References Cited

U.S. PATENT DOCUMENTS 7,699,064 B2 4/2010 Schlief et al.
8,297,768 B2 10/2012 Kara et al.
(Continued)

FOREIGN PATENT DOCUMENTS

CH 693766 A5 1/2004
CN 105201347 A * 12/2015
(Continued)

*Primary Examiner* — Benjamin L Osterhout
(74) *Attorney, Agent, or Firm* — Leydig, Voit & Mayer, Ltd.

(57) ABSTRACT

A household appliance includes: an appliance pedestal; an appliance container providing a treatment space, the appliance container having a loading opening providing access to the treatment space and closable by an appliance door that is pivotably mounted about a pivot axis; a door spring which is arranged, on one end, by arranging a cable pull therebetween, on the appliance door, and on an other end on the appliance pedestal, the door spring spring-loading the appliance door when it is transferred from a closed position which closes the loading opening, into an open position; and a clamping device that interacts with the cable pull, the clamping device having a first clamping element and a second clamping element that is movable relative to the first clamping element, the cable pull being passed between the first clamping element and the second clamping element.

11 Claims, 6 Drawing Sheets

(52) U.S. Cl.
CPC ..... *E05Y 2201/41* (2013.01); *E05Y 2900/304* (2013.01); *F24C 15/023* (2013.01)

(56) References Cited

U.S. PATENT DOCUMENTS

| | | | | |
|---|---|---|---|---|
| 9,055,857 | B2 | 6/2015 | Hotz et al. | |
| 2006/0231217 | A1 * | 10/2006 | Martin | E06B 9/84 160/201 |

FOREIGN PATENT DOCUMENTS

| | | | | | |
|---|---|---|---|---|---|
| CN | 108742456 | A | * | 11/2018 | A47L 15/4259 |
| CN | 209136520 | U | * | 7/2019 | |
| CN | 212234364 | U | * | 12/2020 | |
| CN | 217429960 | U | * | 9/2022 | |
| CN | 218049559 | U | * | 12/2022 | |
| DE | 102004023509 | A1 | | 12/2005 | |
| DE | 102007053093 | A1 | | 5/2009 | |
| DE | 102011050914 | A1 | * | 12/2012 | A47L 15/0049 |
| DE | 102019214619 | A1 | * | 3/2021 | A47L 15/4261 |
| EP | 0692598 | A1 | * | 1/1996 | E05F 1/1261 |
| EP | 2233061 | A1 | | 9/2010 | |
| EP | 2636355 | A1 | * | 9/2013 | A47L 15/0049 |
| EP | 3430966 | A1 | | 1/2019 | |
| WO | WO-2009146874 | A1 | * | 12/2009 | A47L 15/488 |

* cited by examiner

HOUSEHOLD APPLIANCE, IN PARTICULAR DISHWASHER

CROSS-REFERENCE TO PRIOR APPLICATIONS

This application is a U.S. National Phase application under 35 U.S.C. § 371 of International Application No. PCT/EP2023/064766, filed on Jun. 2, 2023, and claims benefit to Belgian Patent Application No. BE 2022/5451, filed on Jun. 10, 2022. The International Application was published in German on Dec. 14, 2023 as WO/2023/237419 A1 under PCT Article 21(2).

FIELD

The invention relates to a household appliance, in particular designed as a dishwasher, comprising an appliance pedestal and an appliance container which provides a treatment space and has a loading opening which provides access to the treatment space and can be closed by means of an appliance door which is pivotably mounted about a pivot axis, and comprising a door spring which is arranged on one end, by arranging a cable pull therebetween, on the appliance door and on the other end on the appliance pedestal, wherein the door spring is designed to spring-load the appliance door when it is transferred from a closed position, which closes the loading opening, into an open position.

BACKGROUND

Household appliances in general and dishwashers in particular are well-known per se from the prior art, and therefore there is no need for separate substantiating documents at this point.

A generic household appliance has an appliance pedestal that supports an appliance container which provides a treatment space. In order to access the treatment space provided by the appliance container, the appliance container has a loading opening which can be closed, preferably in a fluid-tight manner, by means of an appliance door which is pivotably mounted about a pivot axis.

In the case of a dishwasher, in the case of use as intended the treatment space is used to receive washware to be cleaned, which can, for example, be dishes and/or cutlery.

The household appliance also has a door spring. This is arranged at one end, by arranging a cable pull therebetween, on the appliance door and at the other end on the appliance pedestal. In this case, the door spring is designed to spring-load the appliance door when it is transferred from a closed position, which closes the loading opening, into an open position.

The door spring serves in particular to increase the ease of use for a user of the household appliance. When the appliance door is being opened, the door spring is pre-tensioned so that the downward swinging of the appliance door is slowed down. When the appliance door is being transferred into a locking position that closes the loading opening, the previously pre-tensioned door spring helps to pivot the appliance door against the weight force acting on it, thus making it easier for the user to close the door. The door spring therefore serves on the one hand to brake the downward swinging of the appliance door and on the other hand to simplify the upward swinging of the appliance door.

Depending on the design of the household appliance, one or two door springs can be used. In the case of two door springs, a first door spring is preferably used on the left-hand side of the appliance door and a second door spring on the right-hand side of the appliance door.

The use of the door springs described above can take place in particular in the case of appliance doors that are equipped with a decorative panel on the front that increases the total weight of the appliance door, as described, for example, in DE 102004 023 509 A1. Correct adjustment of the door springs ensures that the appliance door remains in any angle position and does not open or close again on its own.

A problem with the design described above is the possibility of a door spring breaking, which may occur even when the appliance is used as intended. In this case, the balance of the appliance door, which is set by means of the door spring, is disturbed and the appliance door is not braked when it is swung down, with the disadvantageous consequence that the appliance door swings down without braking, i.e. is moved into its open position. This unbraked transfer of the appliance door into the open position represents a safety risk, in particular for a user who is in the pivot range of the appliance door. In the event of a door spring defect, accidental personal injury and/or property damage may occur as a result of an appliance door swinging down without braking. This must be prevented, which is why a locking device has already been proposed in EP 3430 966 A1, which is intended to prevent the appliance door from swinging downwards without braking in the event of a door spring breakage.

The locking device known from EP 3430 966 A1 is designed in two parts and has a locking element on the cable pull side, which in the event of a defect interacts with latching elements on the appliance pedestal side. In this case, the locking element is spring-loaded and is arranged on a door hinge on the appliance door. If a door spring breaks, the locking element will pivot due to the spring force acting on the locking element. When the locking element is in a pivoted position, it can come into engagement with latching elements provided on the appliance pedestal side, which, if this is the case, leads to a blocking of any further pivoting movement of the appliance door. In this way, when the locking element engages with associated latching elements in a spring-pivoted manner, any further pivoting movement of the appliance door is prevented. A disadvantage, however, is that if the door spring is defective it will not be possible to immediately stop the appliance door while it is pivoting. This is not the case because the latching elements that interact with the locking element are arranged at a distance from one another, so that only a gradual latching with the locking element is possible, which prevents the appliance door from being stopped immediately in the event of a defect in the door spring. Another disadvantage is that latching of locking element and latching element is not reliably ensured. This is because if the appliance door is pivoted at a sufficient speed, it appears possible that the locking element strikes a latching element without latching with it and then jumps from latching element to latching element. The previously known design is therefore not able to reliably prevent the appliance door from swinging downwards in an uncontrolled manner in the event of a door spring defect.

SUMMARY

In an embodiment, the present invention provides a household appliance, comprising: an appliance pedestal; an appliance container providing a treatment space, the appliance container having a loading opening providing access to the treatment space and closable by an appliance door that is pivotably mounted about a pivot axis; a door spring which is arranged, on one end, by arranging a cable pull therebetween, on the appliance door, and on an other end on the appliance pedestal, the door spring being configured to spring-load the appliance door when it is transferred from a closed position which closes the loading opening, into an open position; and a clamping device configured to interact with the cable pull, the clamping device having a first clamping element and a second clamping element that is movable relative to the first clamping element, the cable pull being passed between the first clamping element and the second clamping element, wherein the second clamping element is spring-loaded in a direction of the cable pull.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
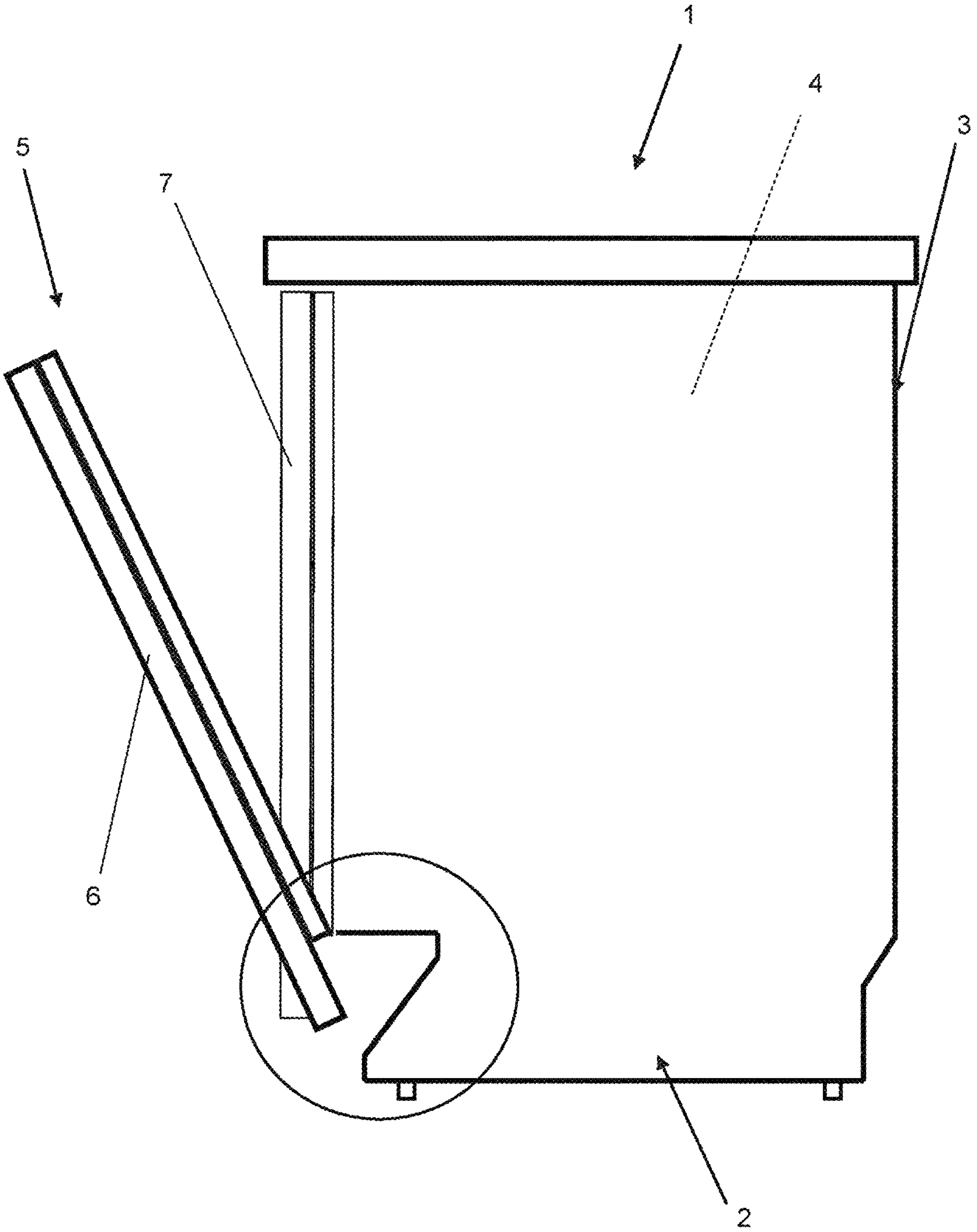
FIG. 1 is a schematic side view of a household appliance according to the invention.

In an embodiment, the present invention provides a household appliance of the type mentioned at the outset in such a way that increased operational safety is ensured even in the event of a defective door spring.

In an embodiment, the present invention provides a household appliance of the type mentioned at the outset, which is characterized by a clamping device that interacts with the cable pull, the clamping device having a first clamping element and a second clamping element that is movable relative thereto, between which two clamping elements the cable pull is passed, the second clamping element being spring-loaded in the direction of the cable pull.

In contrast to the prior art according to EP 3430 966 A1, the present application does not describe a locking device but rather a clamping device. In this case, the clamping device provided according to the invention interacts directly with the cable pull. This makes it possible to be able to immediately arrest the cable pull in the event of a door spring defect, which immediately stops the appliance door from swinging downwards any further. The clamping device according to the invention thus enables the appliance door to be immediately arrested, regardless of its current position, in the event of a defect in the door spring. This significantly increases operational safety, it being reliably ensured that the appliance door does not swing downwards in an uncontrolled manner.

The clamping device provided according to the invention has two clamping elements, namely a first clamping element on the one hand and a second clamping element on the other hand. In this case, the second clamping element is movable in relation to the first clamping element and can therefore move, for example shift and/or rotate, in particular in the direction of the first clamping element.

The cable pull is passed through between the two clamping elements. This allows the cable pull to be securely locked in position between the two clamping elements in the case of a triggering event.

According to the invention, it is further provided that the second clamping element is spring-loaded in the direction of the cable pull. The second clamping element thus presses on the cable pull under spring force. When used as intended, the cable pull itself is under spring preloading, specifically due to the door spring arranged at the other end on the machine pedestal. In other words, as long as the door spring is intact, the spring preloading of the cable pull effected by the door spring ensures that the second clamping element cannot move towards the first clamping element. However, if a door spring breaks, then the spring preloading on the cable pull will decrease, so that the second clamping element is now able to move in the direction of the spring preloading acting on the second clamping element, and therefore in the direction of the first clamping element. As a result, the cable pull is arrested between the two clamping elements in the manner already described above, which also causes the appliance door to be arrested.

The design according to the invention therefore enables immediate, i.e. direct, triggering of the clamping device in the event of a door spring breakage, with the result that the appliance door comes to a standstill in the position in which the door spring broke, in the manner as already described. In this case, no sensors and/or other electronic components are required for the triggering. Rather, the second clamping part interacts directly with the cable pull and in the event of a door spring break automatically pivots in the direction of the first clamping element as soon as the spring preloading acting on the cable pull decreases due to spring breakage.

The clamping device provided according to the invention is therefore self-triggering and extremely robust in construction, so that the desired operational safety is guaranteed over the service life of the household appliance.

According to a further feature of the invention, it is provided that the second clamping element is in contact with the cable pull and rests against it. Thus, in the event of a defect in the door spring, immediate triggering of the second clamping element by movement is ensured. Since the second clamping element is in contact with the cable pull, if the door spring fails, slackening of the cable pull automatically leads to the clamping element, which is spring-loaded in the direction of the cable pull, being moved. This movement of the second clamping element results in the cable pull being locked between the first and second clamping elements, which reliably prevents the appliance door from pivoting any further. A slackening of the cable pull as a result of a door spring break therefore leads to an immediate, i.e. instantaneous, activation of the clamping device by movement of the second clamping element.

According to a further feature of the invention, it is provided that the second clamping element is designed to be pivotable. According to the invention, it is provided that the second clamping element is movable in relation to the first clamping element. This achieves, in the manner already described, that in the event of a defect in the door spring the second clamping element moves in the direction of the first clamping element, as a result of which the cable pull is locked. It is now preferred that the second clamping element is designed to be pivotable. This results in a construction that is particularly simple, yet safe, because it is robust.

According to a further feature of the invention, it is provided that the first clamping element is provided by a deflection roller around which the cable pull is guided. This structural measure also supports an overall simple, yet robust, construction. This is because, according to this embodiment the deflection pulley, which is provided anyway for guiding the cable pull, is also part of the clamping device according to the invention, as the first clamping element. On the appliance side, there is therefore no need for the separate design of a first clamping element. The deflection roller, which is present anyway, can be used for this purpose. This makes the construction according to the invention particularly simple and inexpensive to implement and manufacture.

According to a further feature of the invention, it is provided that the second clamping element has a convex clamping surface on the deflection roller side.

When the clamping device is used as intended, the second clamping element pivots due to the spring force acting on the second clamping element. In this case, the second clamping element is placed on the first clamping element with the cable pull in between. According to the invention, it is now provided that the second clamping element has a convex clamping surface on the deflection roller side. Thus, during operation, the clamping surface interacts with the deflection roller, with the cable pull in between. Due to the convex design, a clamping gap that tapers in the direction of the deflection roller results, which leads to the portion of the cable pull on the appliance door side pulling further in the direction of the tapered clamping gap, which in turn leads to an even greater pivoting of the second clamping element. The consequence of this design is thus that the more the cable pull is loaded by the weight of the appliance door, the more the clamping force increases.

According to a further feature of the invention, it is provided that one of the two clamping elements has teeth on the cable pull side. According to the embodiment described above, it is preferred if the convex clamping surface of the second clamping element is equipped with corresponding teeth. In the case of use as intended, said teeth dig into the cable pull locked between the first clamping element and the second clamping element, which further promotes a securely positioned hold of the cable pull by the clamping device.

According to a further feature of the invention, it is provided that a spring element, in particular a tension spring or a leg spring, is provided for spring preloading of the second clamping element, which spring element is arranged at one end on the appliance pedestal and at the other end on the second clamping element. By means of this spring element, in particular the tension or leg spring, the second clamping element is spring-loaded in the direction of the first clamping element. In this case, if the door spring is not defective, the second clamping element rests on the cable pull. The cable pull therefore counteracts a pivoting movement of the second clamping part. If a spring breaks, the spring preloading acting on the cable pull through the door spring decreases, with the result that the cable pull becomes slack. As a result, the cable pull no longer provides an abutment with regard to the possible pivoting movement of the second clamping element, so that the second clamping element can pivot under the influence of the spring element arranged thereon, namely in the direction of the first clamping element. In this case, the second clamping element also pivots in relation to the appliance pedestal, on which the spring element is arranged at the other end.

According to an alternative embodiment, it is provided according to a further feature of the invention that the first clamping element is provided by a support element which is fixed on the appliance pedestal side, in particular arranged so as to be pivotable about a pivot axis that is fixed at the appliance pedestal side, and which has a contact surface equipped with teeth for the cable pull.

According to this embodiment, a support element is used as the first clamping element, instead of a deflection roller. This support element has a contact surface which, when used as intended, serves for abutment of the cable pull. In this case, the cable pull is pressed against the contact surface of the support element by means of the second clamping element. In order to ensure that the cable pull is securely locked in position, the contact surface is equipped with teeth into which the cable pull digs under the force of the second clamping element.

According to a further feature of the invention, in connection with the alternative embodiment it is provided that the second clamping element is pivotably arranged on the first clamping element. In this respect, the first clamping element and the second clamping element form a modular unit. The advantage of this embodiment compared to the first alternative is in particular that it is also easy to retrofit existing household appliances. For this purpose, the support element, i.e. the first clamping element, can be arranged, for example, at the articulation point for a deflection roller of the cable pull, in particular can be arranged so as to be pivotable about this articulation point. No further interventions on the appliance side are required for retrofitting. This is because the first and the second clamping element are pre-assembled and arranged on one another, the second clamping element being pivotable in relation to the support element, and a spring element, in particular a tension spring or a leg spring, being provided for spring preloading of the second clamping element, which is arranged at one end on the first clamping element and at the other end on the second clamping element.

The embodiment according to the invention proposes, overall a clamping device which, in the event of a defective door spring, immediately stops the appliance door from swinging downwards, in an operationally safe and reliable manner, and securely locks the appliance door in this stopped position. This advantageously increases the operational safety of the household appliance according to the invention.

FIG. 1 shows, in a purely schematic side view, a household appliance according to the invention in the form of a dishwasher 1.

The dishwasher 1 has, in a manner known per se, an appliance pedestal 2 and an appliance container 3 which provides a treatment space 4.

The treatment space 4 is accessible to the user via a loading opening of the appliance container 3, which loading opening can be closed preferably in a fluid-tight manner by means of a pivotably mounted appliance door 5. During use as intended, the appliance door 5 can be transferred from an open position to a closed position that closes the loading opening, and vice versa. According to the illustration in FIG. 1, the appliance door 5 is shown both in an open position 6 and in a closed position 7.

Figure 2:
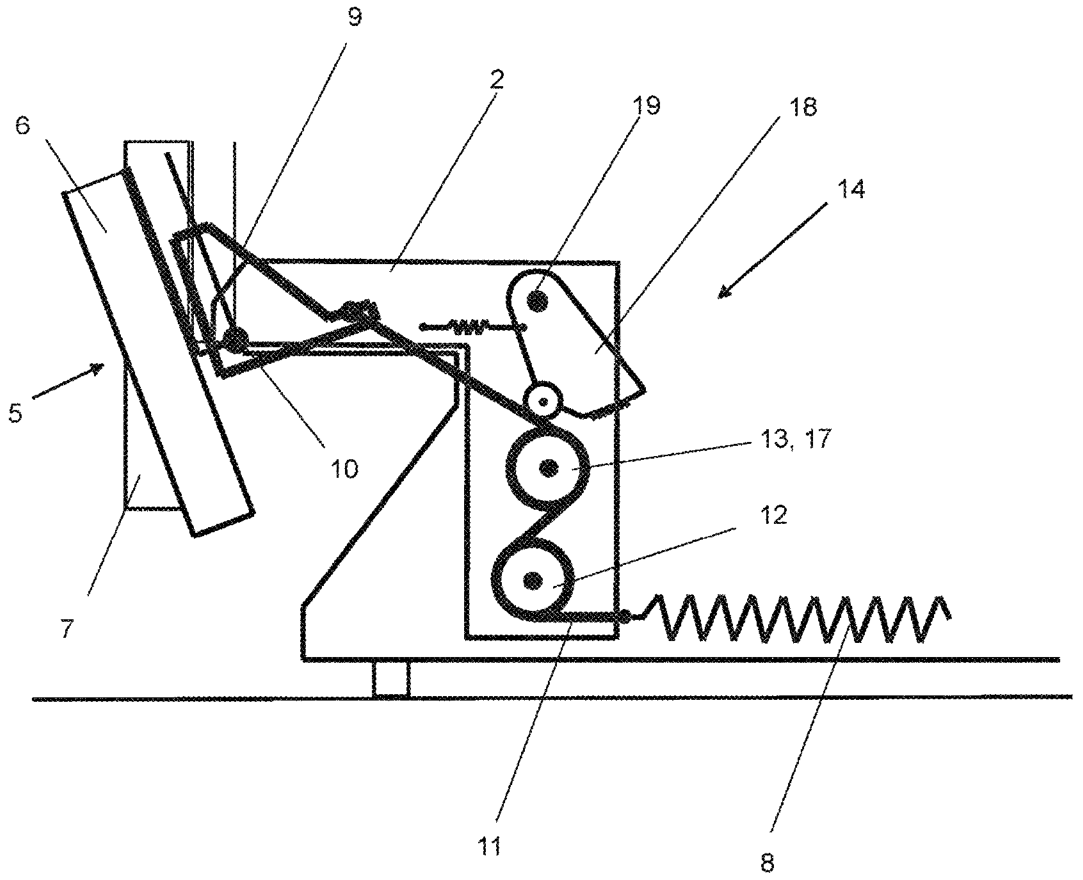
FIG. 2 is a schematic side view of the clamping device according to the invention.

The appliance door 5 interacts with a door spring 8, as can be seen in particular from the illustration according to FIG. 2. In this case, during opening the door spring 8 serves to brake a pivoting of the appliance door 5 into an open position 6, which is achieved by tensioning the door spring 8. When the appliance door 5 is moved into the closed position 7, the door spring 8, which was previously pre-tensioned during opening, serves to support the user-side closing movement of the appliance door 6, which simplifies pivoting of the appliance door 5.

As can be seen from the illustration in FIG. 2, the appliance door 5 has a door hinge 9 on the appliance container side. By means of this door hinge 9, the appliance door 5 can be pivoted about the pivot axis 10, that is to say, with reference to the drawing plane according to FIG. 2, in a clockwise direction or in the opposite direction, depending on whether the appliance door 6 is moved from an open position to a closed position or vice versa.

The door spring 8 is arranged on one end, by arranging a cable pull 11 therebetween, on the appliance door 6 and on the other end on the appliance pedestal 2. In this case, two deflection rollers 12 and 13 are used to guide the cable pull.

Figure 3:
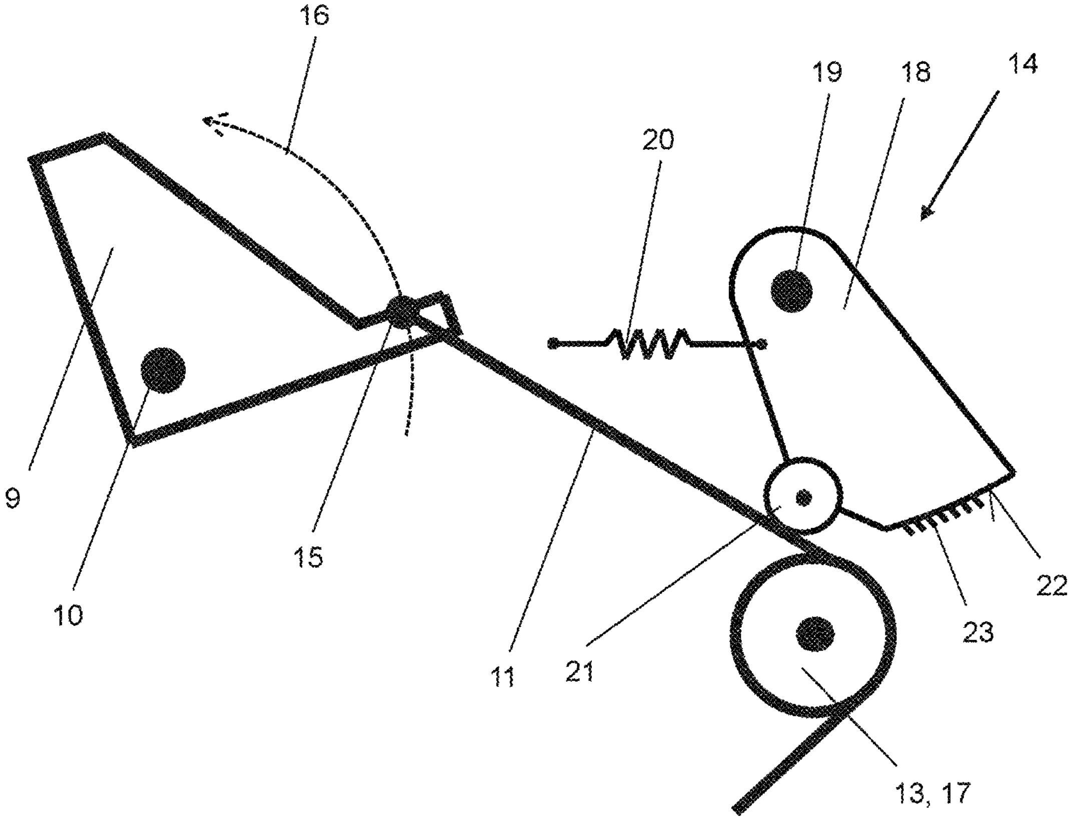
FIG. 3 is a schematic detailed view of the clamping device according to the invention according to FIG. 2 with the door spring intact.

As can be seen additionally from FIG. 3, the end of the cable pull 11 on the appliance door side is arranged on the door hinge 9, specifically at the articulation point 15. When the appliance door 5 moves, this articulation point 15 moves along a circular path around the pivot axis 10, as indicated in FIG. 3 by the arrow 16.

As can be further seen from the illustration in FIG. 2, the dishwasher 1 according to the invention has a clamping device 14 which interacts with the cable pull 11. This clamping device 14 has a first clamping element 17 and a second clamping element 18, as can be seen in particular from the detailed view according to FIG. 3. In this case, FIG. 3 relates to a first alternative embodiment of the invention, according to which the first clamping element 17 is provided by the deflection roller 13, around which the cable pull 11 is guided.

According to the invention, the second clamping element 18 is spring-loaded in the direction of the cable pull 11. For this purpose, according to the embodiment in FIG. 3, it is provided that the second clamping element 18 is pivotable about a pivot point 19, a spring element, which is designed here without restriction of generality as a tension spring 20, being provided, which is arranged at one end on the appliance pedestal 2 and at the other end on the second clamping element 18. By means of this spring element or tension spring 20, the second clamping element 18 strives to rotate clockwise with respect to the drawing plane according to FIG. 3, and thus to pivot in the direction of the cable pull 11.

According to the embodiment according to FIG. 3, the second clamping element 18 has a clamping surface 22 on the deflection roller side, which is equipped with teeth 23. Furthermore, a roller 21 or a sliding piece is provided, by means of which the second clamping element 18 is in contact with the cable pull 11 and rests against it.

FIG. 3 shows a situation in which the door spring 8 is intact, and due to the door spring the cable pull 11 is under spring preloading and is therefore tensioned. In this situation, the second clamping element 18 rests against the cable pull 11 with the roller 21 therebetween, the cable pull 11 being able to be moved in relation to the second clamping element 18 with little wear when the appliance door 5, moves due to the roller 21.

Figure 4:
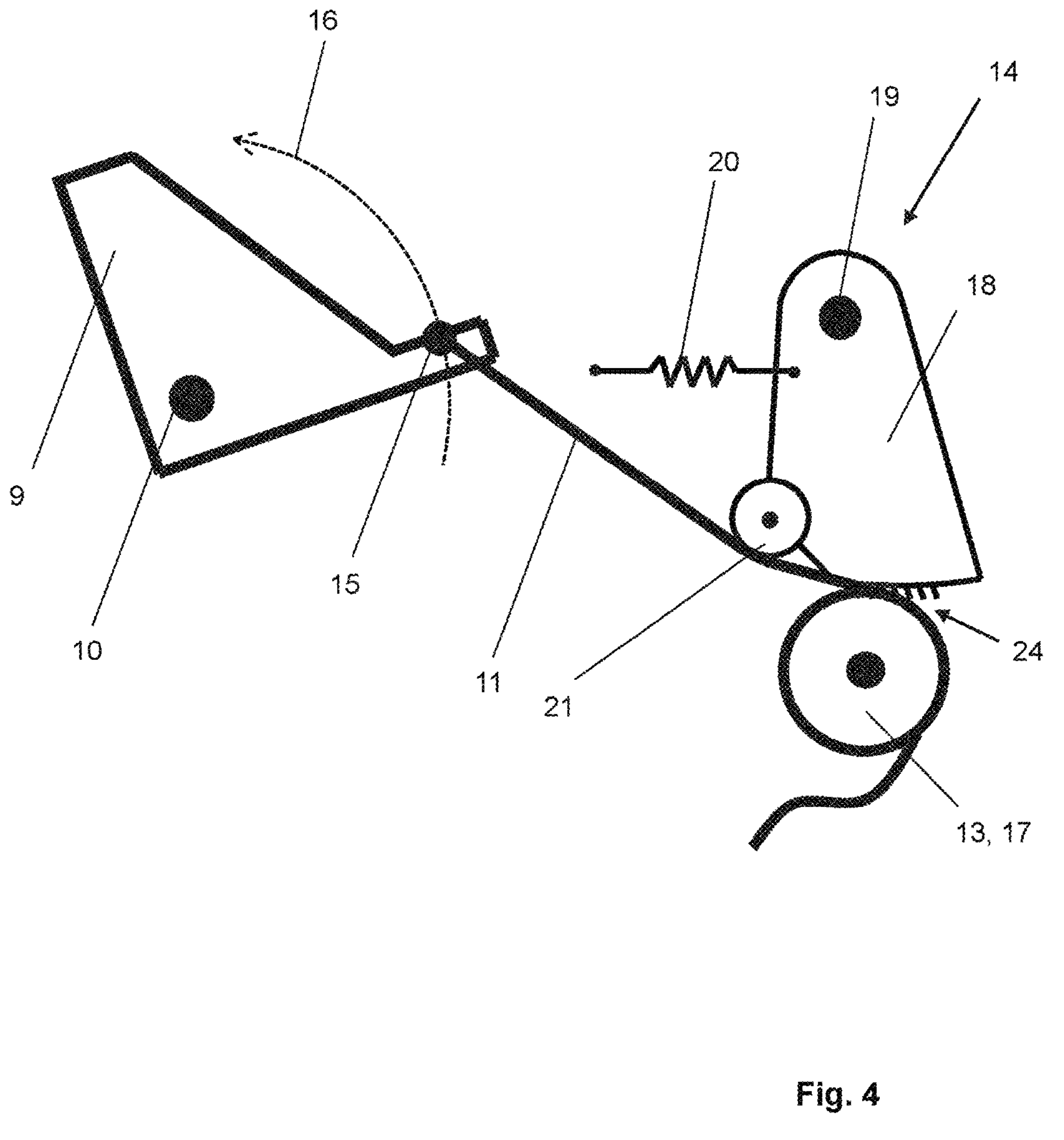
FIG. 4 is a schematic detailed view of the clamping device according to the invention according to FIG. 2 with a defective door spring.

FIG. 4 shows the clamping device 14 according to the invention in the case of a breakage of the door spring 8.

If the door spring 8 is defective, the cable pull 11 will no longer be under spring preloading. As a result, the cable pull 11 gives way and sags. This enables the second clamping element 18 to pivot due to the spring force acting on the second clamping element 18 by the spring element or the tension spring 20, namely clockwise about the pivot point 19 with reference to the drawing plane according to FIG. 4.

As a result, the second clamping element 18 pivots in the direction of the deflection roller 13 serving as the first clamping element 17, so that a clamping gap 24 is formed between the clamping surface 22 provided by the second clamping element 18 and the deflection roller 13. The clamping surface 22 is preferably convex, so that a gap 24 tapering in the direction of the deflection roller 13 is created. In this gap, the cable pull 11 tightens between the first clamping element 17 and the second clamping element 18, which leads to a stop in the movement of the appliance door 6. In order to ensure that the cable pull 11 is held securely in position, it is also preferable to equip the clamping surface 22 with teeth 23 which dig into the cable pull when used as intended.

The tapered design of the gap 24 also advantageously ensures that the more the cable pull is loaded by the door weight of the appliance door 5, the higher will be the clamping force prevailing between the two clamping elements 17 and 18.

The particular advantage of the embodiment according to FIGS. 3 and 4 is that the deflection roller 13 provided anyway by the dishwasher 1 is used as the first clamping element 17.

Figure 5:
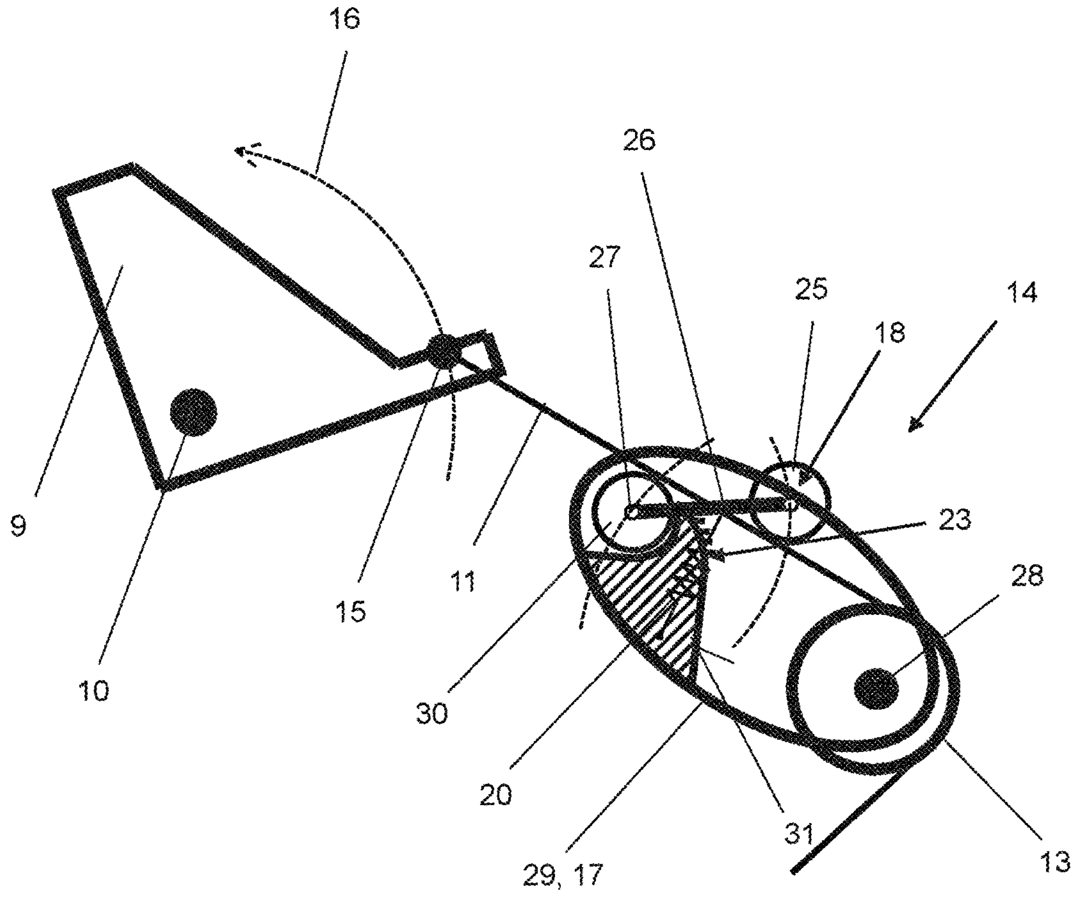
FIG. 5 is a schematic representation of a second embodiment of the invention with an intact door spring.
Figure 6:
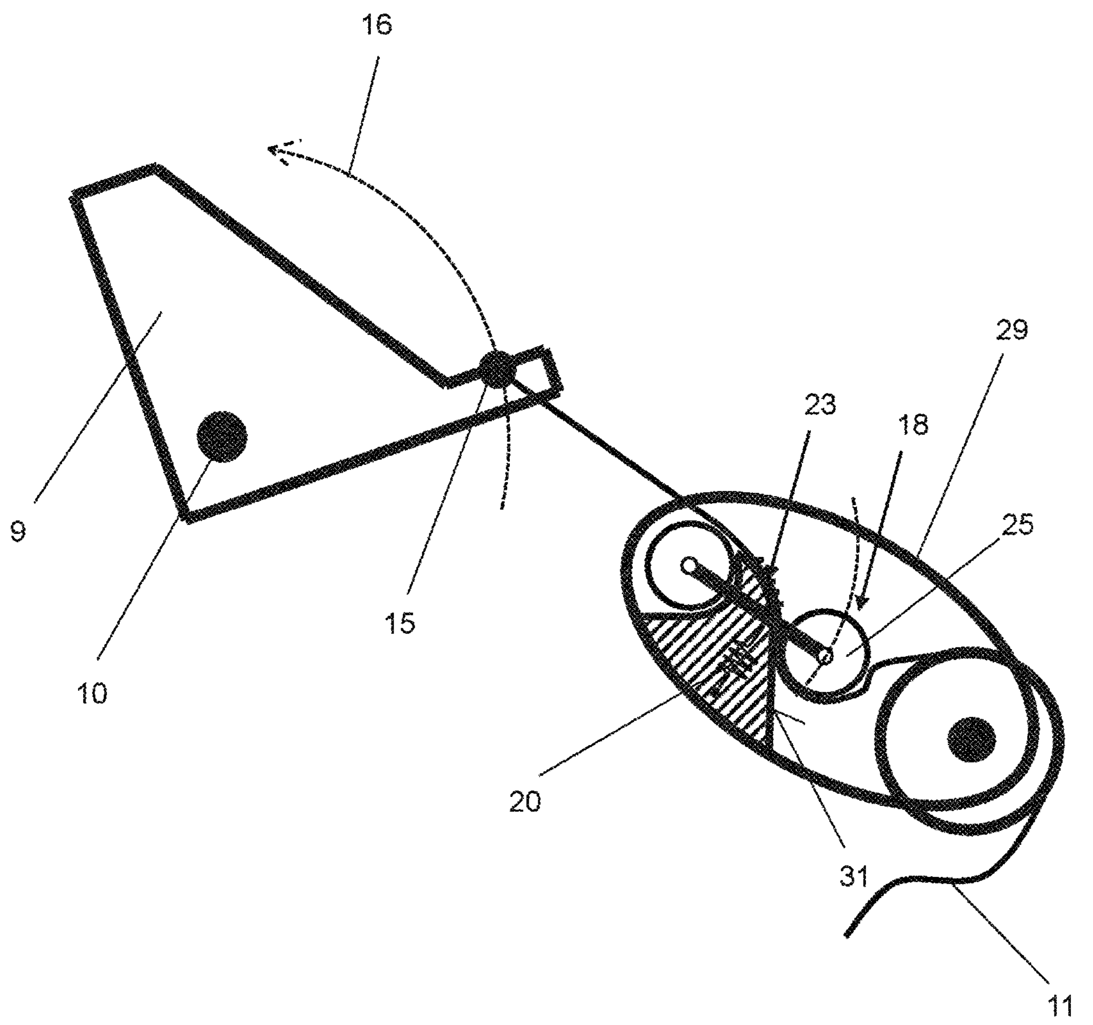
FIG. 6 is a schematic representation of a second embodiment of the invention with a defective door spring.

An alternative embodiment of the clamping device 14 according to the invention is shown in FIGS. 5 and 6. According to this embodiment, the first clamping element 17 is provided by a support element 29 fixed on the appliance pedestal side. For fixing on the appliance pedestal side, the support element 29 is pivotably mounted on the pivot axis 28 of the deflection roller 13, so that during normal operation, when the appliance door 5 is pivoted about its pivot axis 10, a certain pivoting movement of the support element 29 about the pivot axis 28 occurs. In this case, during normal operation, the cable pull 11, particularly in the portion between the deflection roller 13 and the articulation point 15, remains tensioned in every door position.

The support element 29 in turn pivotably supports the second clamping element 18. In the embodiment shown, this has a roller 25 which is arranged on one end of a rod 26. At the other end, the rod 26 is arranged on the support element 29 so as to be pivotable about a pivot point 27.

Furthermore, a roller 30 over which roller the cable pull 11 is guided, is arranged so as to be rotatable about the pivot point 27, which serves to move the cable pull 11 past the support element 29 with little wear when the appliance door 5 is pivoted as intended.

The support element 29 further provides a contact surface 31 which is equipped with teeth 23.

According to the situation shown in FIG. 5, the door spring 8 is intact. As a result, the cable pull 11 is tensioned and is guided between the rollers 30 and 25 with little wear.

FIG. 6 shows a situation with a defective, i.e. broken, door spring 8. As a result of a breakage of the door spring 8, there is a sudden reduction in the tension acting on the cable pull 11. As a result, the cable pull 11 slackens, which allows the second clamping element 18 to rotate as a result of the spring force generated by the spring element, i.e. for example, by the tension spring 20, clockwise in relation to the drawing plane according to FIGS. 5 and 6. As a result, the roller 25 of the second clamping element 18 presses the cable pull 11 against the contact surface 31 provided by the support element 29. The cable pull 11 is thereby pressed into the teeth 23 provided by the contact surface 31, which leads to an immediate stop of the movement of the appliance door 5. FIG. 6 shows this securely positioned locking of the appliance door 6.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS

1 Dishwasher
2 Appliance pedestal
3 Appliance container
4 Treatment space
5 Appliance door
6 Appliance door (open position)
7 Appliance door (closed position)
8 Door spring
9 Door hinge
10 Pivot axis
11 Cable pull
12 Deflection roller
13 Deflection roller
14 Clamping device
15 Articulation point
16 Arrow
17 First clamping element
18 Second clamping element
19 Pivot point
20 Spring element
21 Roller/sliding piece
22 Clamping surface
23 Teeth
24 Gap
25 Roller
26 Rod
27 Pivot point
28 Pivot axis
29 Support element
30 Roller
31 Contact surface

The invention claimed is:

1. A household appliance, comprising:
an appliance pedestal;
an appliance container providing a treatment space, the appliance container having a loading opening providing access to the treatment space and closable by an appliance door that is pivotably mounted about a pivot axis;
a door spring which is arranged, on one end, by arranging a cable pull therebetween, on the appliance door, and on an other end on the appliance pedestal, the door spring being configured to spring-load the appliance door when it is transferred from a closed position, which closes the loading opening, into an open position; and
a clamping device configured to interact with the cable pull, the clamping device having a first clamping element and a second clamping element that is movable relative to the first clamping element, the cable pull being passed between the first clamping element and the second clamping element,
wherein the second clamping element is spring-loaded in a direction of the cable pull.

2. The household appliance of claim 1, wherein the second clamping element is in contact with the cable pull and rests against the cable pull.

3. The household appliance of claim 1, wherein the second clamping element is pivotable.

4. The household appliance of claim 1, wherein one clamping element of the first clamping element and the second clamping element carries teeth on a cable pull side thereof.

5. The household appliance of claim 1, wherein the first clamping element comprises a deflection roller around which the cable pull is guided.

6. The household appliance of claim 5, wherein the second clamping element has a convex clamping surface on a deflection roller side thereof.

7. The household appliance of claim 1, further comprising:
a spring element configured to spring preload the second clamping element, which spring element is arranged at one end on the appliance pedestal and at an other end on the second clamping element.

8. The household appliance of claim 1, wherein the first clamping element comprises a support element fixed on an appliance pedestal side, which has a contact surface equipped with teeth for the cable pull.

9. The household appliance of claim 8, wherein the second clamping element is arranged pivotably on the first clamping element.

10. The household appliance of claim 8, further comprising:
a spring element configured to spring preload the second clamping element, which spring element is arranged at one end on the first clamping element and at an other end on the second clamping element.

11. The household appliance of claim 1, wherein the household appliance comprises a dishwasher.

* * * * *